July 18, 1939.  W. C. DRAHEIM  2,166,861
PORTABLE GRINDER
Filed Oct. 17, 1938  2 Sheets-Sheet 2
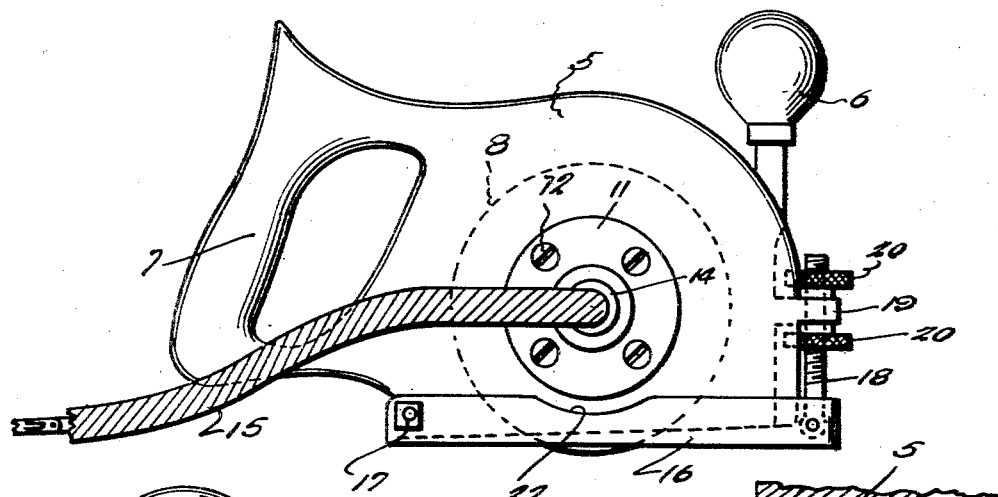
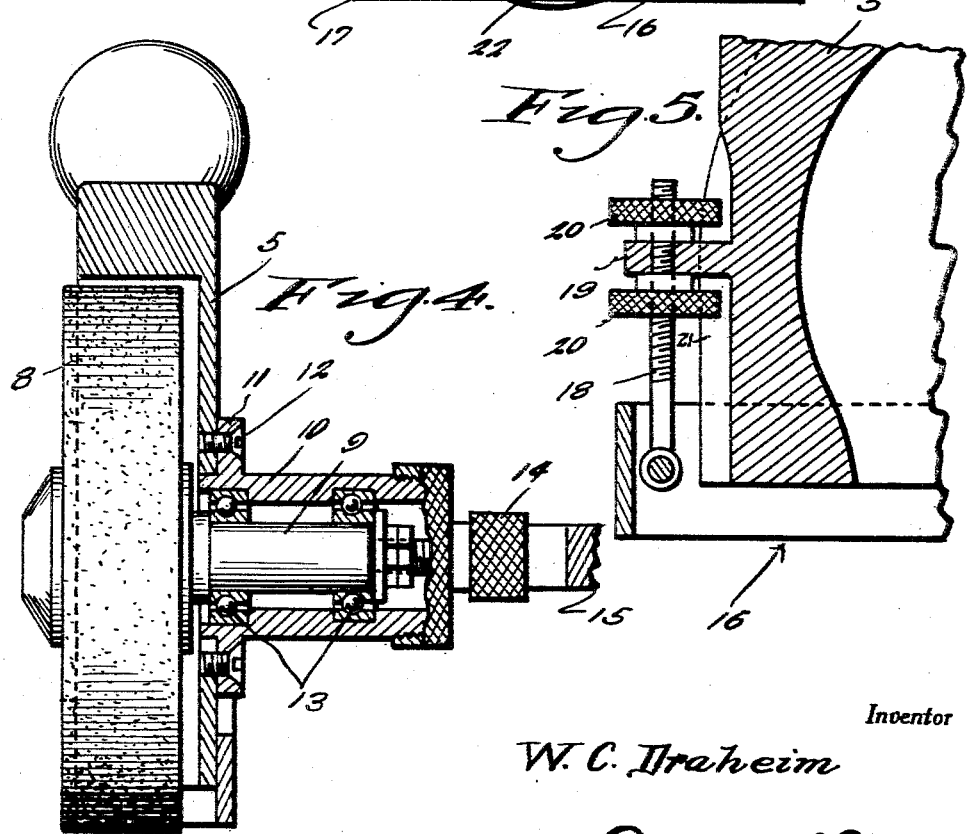
Inventor
W. C. Draheim
By Clarence A. O'Brien
and Hyman Berman
Attorneys

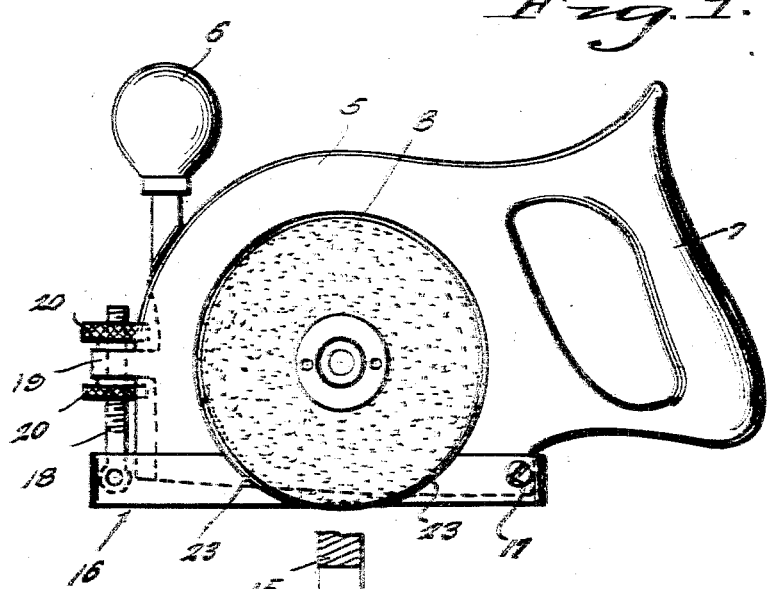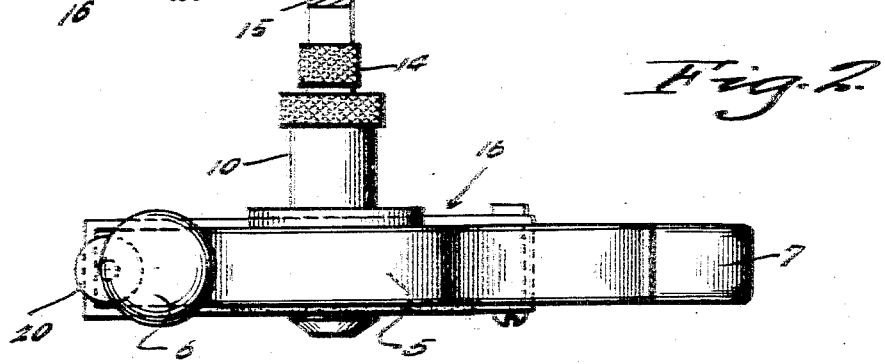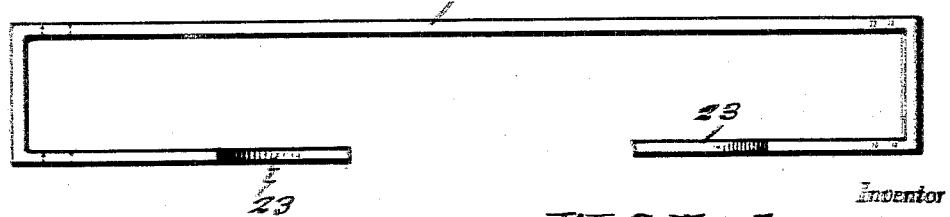

Patented July 18, 1939

2,166,861

UNITED STATES PATENT OFFICE 2,166,861

PORTABLE GRINDER

William C. Draheim, Withee, Wis.

Application October 17, 1938, Serial No. 235,493

1 Claim. (Cl. 51—170)

This invention relates to portable, hand grinders, and an object of the invention is to, generally, improve upon such types of grinders as are now known and used.

The invention together with its objects and advantages will be best understood from a study of the following description taken in connection with the accompanying drawings wherein:

Figure 1 is an elevational view of a grinder showing the same from one side thereof.

Figure 2 is a top plan view of a grinder embodying the features of the present invention.

Figure 3 is an elevational view of the grinder, viewing the same from the side thereof opposite to that shown in Figure 1.

Figure 4 is a sectional view through the grinder showing certain details hereinafter more fully referred to.

Figure 5 is a detail sectional view also illustrating certain details hereinafter more fully referred to, and Figure 6 is a plan view of a gauge bar forming part of the invention.

Referring more in detail to the drawings it will be seen that in the preferred embodiment thereof the grinder comprises a frame 5 provided at the forward end thereof with a suitable handle knob 6 and at the rear end thereof with a suitable integral handle 7.

The frame 5 is substantially completely closed on one side thereof and open on the opposite side as shown.

Accommodated within the frame 5 is a rotary tool 8 which, in the present instance is in the form of an emery wheel. The wheel 8 is suitably mounted on a shaft 9 which has an end extending into a bearing housing 10 that projects from the closed side of the frame 5. The bearing housing 10 at one end thereof is provided with a flange 11 through the medium of which and screws or other fastening elements 12 said bearing housing is secured to one side of the frame 5.

Arranged within the bearing housing 10 for accommodating the shaft 9 are suitable anti-friction devices or bearings 13 as shown in Figure 4.

If desired, an electric motor may be directly connected with the shaft 9 for driving the tool 8, or, and as shown in Figure 4, there may be suitably coupled to the shaft 9 as at 14 one end of a flexible driving shaft 15 feeding from any suitable source of power.

Further in accordance with the present invention there is provided a substantially rectangular frame-like gauge bar 16 which at one end thereof is pivoted to the handle-equipped end 7 of the frame 5 adjacent the bottom of the frame as at 17.

Pivoted between the sides of the frame 16 at the opposite end thereof is the crosshead of a T-shaped screw 18 that is accommodated by an apertured lug 19 provided on the forward end of the frame 5 as shown.

Engaged with the screw 18 above and below the lugs 19 are adjusting screws 20.

Manifestly with the nuts 20 loose on the bolt 18 the gauge bar 15 may be swung on its pivot 17 to the desired position of adjustment and held in said position of adjustment by threading the nuts home on the bolt 18. To accommodate the nuts 20 the frame 5 at the forward end thereof is provided with a vertical groove 21 as best shown in Figure 5.

To accommodate the flange 11 of the housing 10 the gauge bar 16 at one side thereof is provided with an arcuate notch 22 in the upper edge of said one side.

At the opposite side thereof the gauge bar 16 has a portion thereof removed to provide for the accommodation of the periphery of the tool or grinding wheel 8, and the terminals of the bar resulting from the formation of this space have arcuate edges 23 to conform to the periphery of the wheel 8, the arcuate edges 23 thus providing therebetween a slot in said side of the gauge bar 16 for the grinding tool or wheel 8.

Obviously, in operation the wheel or tool 8 will be driven from a motor mounted on the tool if desired, or from a source of power remote from the tool and through the medium of the flexible driving shaft 15, at a suitable speed. The operator places one hand on the handle knob 6 and with the other hand grips the handle 7 for moving the tool across the surface to be operated upon, the operating tool quickly removing the material of such surface to the desired extent and as the cutting depth of the tool is controlled by the adjustment of the gauge 16.

It is thought that a clear understanding of the construction, operation and utility of a machine of this character will be had without a more detailed description thereof.

Having thus described the invention what is claimed as new is:

A grinding machine of the class described comprising a vertically arranged and longitudinally elongated narrow body having a circular opening in one side thereof, the lower edge of the body being substantially flat with the opening extending through an intermediate part of said edge, a circular tool located in the opening, a horizontally arranged bearing housing connected to the closed side of the body, a shaft journaled in said housing and extending into the opening and connected with the tool, means for rotating the shaft, said body having an extension at one end thereof provided with an opening for forming a handle, an upright handle adjacent the other end of the body, a gauge bar having U-shaped end portions, means for pivoting one end portion to the lower part of the handle end of the body, a screw having an end pivotally connected with the other end portion of the bar, a perforated projection at the front end of the body through which the screw passes, upper and lower nuts on the screw between which the projection is located, said bar having its side portions located adjacent the side faces of the body, with the free limbs of the U-shaped portions having their inner ends curving downwardly and inwardly to form a space between them for receiving a portion of the tool.

WILLIAM C. DRAHEIM.